United States Patent
Schlör

[11] Patent Number: 6,164,457
[45] Date of Patent: Dec. 26, 2000

[54] FILTER CARTRIDGE HAVING A FILTER ELEMENT INSERTED IN A FLEXURALLY RIGID FRAME

[75] Inventor: Ulrich Schlör, Darmstadt, Germany

[73] Assignee: Firma Carl Freudenberg, Weinheim, Germany

[21] Appl. No.: 09/309,630

[22] Filed: May 11, 1999

[30] Foreign Application Priority Data

May 14, 1998 [DE] Germany ............ 198 21 676

[51] Int. Cl.[7] .................................. B01D 35/30
[52] U.S. Cl. ............... 210/455; 210/232; 210/473; 55/DIG. 5; 55/DIG. 31
[58] Field of Search ..................... 210/232, 455, 210/473; 55/DIG. 5, DIG. 31

[56] References Cited

U.S. PATENT DOCUMENTS

| | | | |
|---|---|---|---|
| 3,793,692 | 2/1974 | Tate et al. ........................ | 210/484 |
| 3,992,173 | 11/1976 | Wharton et al. ................. | 55/DIG. 5 |
| 4,323,379 | 4/1982 | Shearin ........................... | 55/DIG. 31 |
| 5,273,564 | 12/1993 | Hill .................................. | 55/493 |
| 5,399,180 | 3/1995 | Kopp ............................... | 210/453 |
| 5,693,108 | 12/1997 | Roome ............................ | 55/DIG. 5 |

FOREIGN PATENT DOCUMENTS 43 23 522  1/1995  Germany .

Primary Examiner—David A. Simmons
Assistant Examiner—Betsey Morrison Hoey
Attorney, Agent, or Firm—Kenyon & Kenyon

[57] ABSTRACT

A filter cartridge having a flexurally rigid frame with a filter element inserted therein is formed of a frame composed of a blank in a single piece, and is folded inward forming a double-walled box profile.

13 Claims, 3 Drawing Sheets

FILTER CARTRIDGE HAVING A FILTER ELEMENT INSERTED IN A FLEXURALLY RIGID FRAME

FIELD OF THE INVENTION

The present invention relates to a filter cartridge having a flexurally rigid frame with a filter element inserted therein. The present invention further relates to a method for producing the frame for the filter cartridge.

BACKGROUND OF THE INVENTION

Filter cartridges of this kind are used for filtering air flows and gas flows, including in vehicle air conditioning systems. German utility model patent 43 23 522 deals with a filter cartridge in which an accordion-folded filter element is retained in a frame made of U-shaped strips. The production of such a filter cartridge, particularly of the frame, entails a relatively substantial outlay, since expensive tools are needed for the purpose. It is economically worthwhile to produce the tools only if rather large series are to be fabricated.

SUMMARY OF THE INVENTION

The object of the present invention is to create a filter cartridge which may be produced especially simply, so that even smaller quantities can be produced cost-effectively.

This object is achieved according to the present invention in a filter cartridge having a flexurally rigid frame with a filter element inserted therein, in that the frame is composed of a blank in a single piece, which is folded inward to form a double-walled box profile and joined to the filter element. According to the present invention, a blank in a single piece, provided with folding edges, is cut from a flat workpiece. The folding edges are arranged in such a way that the blank, when appropriately folded, yields a frame having double walls. The filter element is inserted into the frame formed in this manner.

It is advantageous if the blank includes a flat, rectangular base frame, which is adjoined by the outer walls, face walls, inner walls and base tongues, in sequence from the center outward, separated from one another by initial folding edges. When the blank is folded to form the box profile, the base frame remains in the original plane of the workpiece. An initial upward folding produces the four outer walls; a second and third folding yield the face walls and inner walls. The face walls are in a plane parallel to the plane of the base frame. The outer and inner walls likewise extend parallel to one another, but perpendicular to the base frame and face walls.

At least two mutually opposite inner walls are joined via second folding edges to tongues that may be engaged with the other, remaining inner walls. The inner walls may be firmly joined to one another via these tongues.

The outer walls, in comparison to the inner walls, may also be provided with tongues and fixed together. But it is more advantageous if pairs of mutually adjacent outer walls are joined together by square corner sections. The corner sections are perforated by additional folding edges that pass diagonally through the corner sections and end at the base frame. During the folding process that yields the box profile, the corner sections form additional tongues which help make the entire frame rigid once the additional tongues are appropriately fixed to the outer walls.

During folding, the base tongues present on the inner walls are applied flush against the surface of the base frame and joined nonremovably to it. The base tongues are present on all four inner walls and help make the base frame rigid.

The base frame is greater in breadth than the breadth of the face walls. As a result, the filter element inserted in the box profile is retained by the base frame. Consequently, it is possible to insert a prefabricated filter element into the frame formed by folding, at which time the filter cartridge is ready for use. To fasten the filter, particularly its folds, definitively in position within the box profile, it is advantageous if the inner walls of the box profile extending perpendicular to the folds of the filter are provided with recesses into which the associated fold ends of the filter may be inserted. In this way, distortion or shifting of the filter element may be avoided.

In a preferred embodiment, the frame and the filter element are produced of the same material, then fitted together. If applicable, the frame and the filter element are glued together.

In many cases it is usual to use a gasket between the filter frame and the associated retaining arrangement, so as to prevent undesirable flows of air around the sides. In a further configuration according to the present invention, in the present box profile the outer walls have a plurality of slots for fastening a sealing material edging the frame. This sealing material may, for example, be a nonwoven material, which is laid around the frame and pressed by sections into the slots in the outer walls. In this way a very simple sealing of the filter cartridge in its retaining arrangement may be achieved. The length of the slots is defined as a function of the employed sealing material, and their ends are provided with holes that contribute toward a springlike bending-back of the slot edges. Pressing the sealing material into the slot causes the slot edges to bend inward and oppose the withdrawal of the sealing material from the slots. In box profiles with rather large dimensions, it is advantageous if at least two rows of slots are provided in the outer walls. These permit the upper and lower edge segments of the sealing material to be held securely on the outer wall.

It is possible to produce the new filter cartridge using appropriately configured punching tools. The particular advantage in the production of the frame, however, is that the blank for the frame may be produced from a flat workpiece using an industrial plotter. Technologies in common use today may be applied for this purpose. For example, the profile may be cut out using saws or laser beams. The folding edges may also be produced in this way, as may the perforation, where needed.

DETAILED DESCRIPTION

Figure 1:
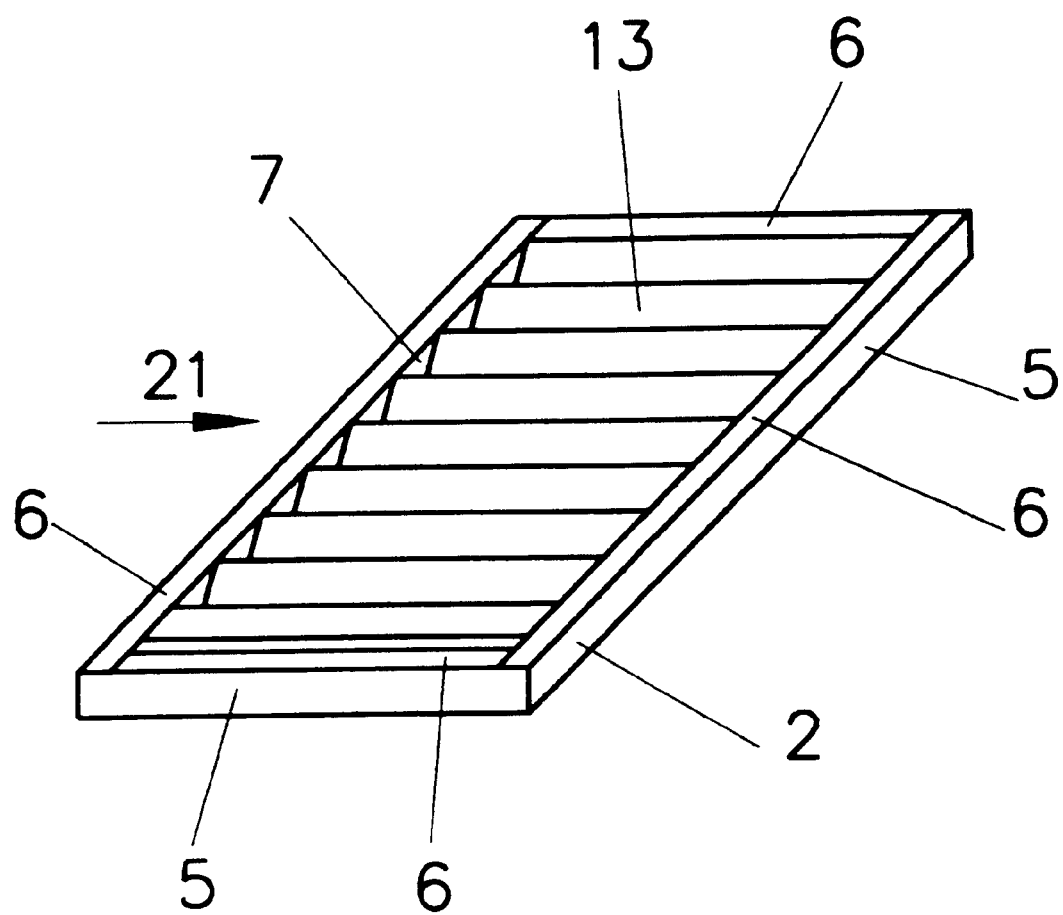
FIG. 1 shows a perspective view of a filter cartridge constructed according to the principles of the present invention.

Filter cartridge 21 shown in FIG. 1 is essentially composed of box profile 2 and filter element 13 inserted therein. Filter element 13 is composed of an accordion-folded continuous length of nonwoven fabric. Box profile 2 is double-walled, with outer walls 5 and inner walls 7. Face walls 6 between the outer walls 5 and inner walls 7 are also visible. The box profile 2 is likewise made of nonwoven fabric. Filter element 13 and box profile 2 are permanently fixed together.

Figure 2:
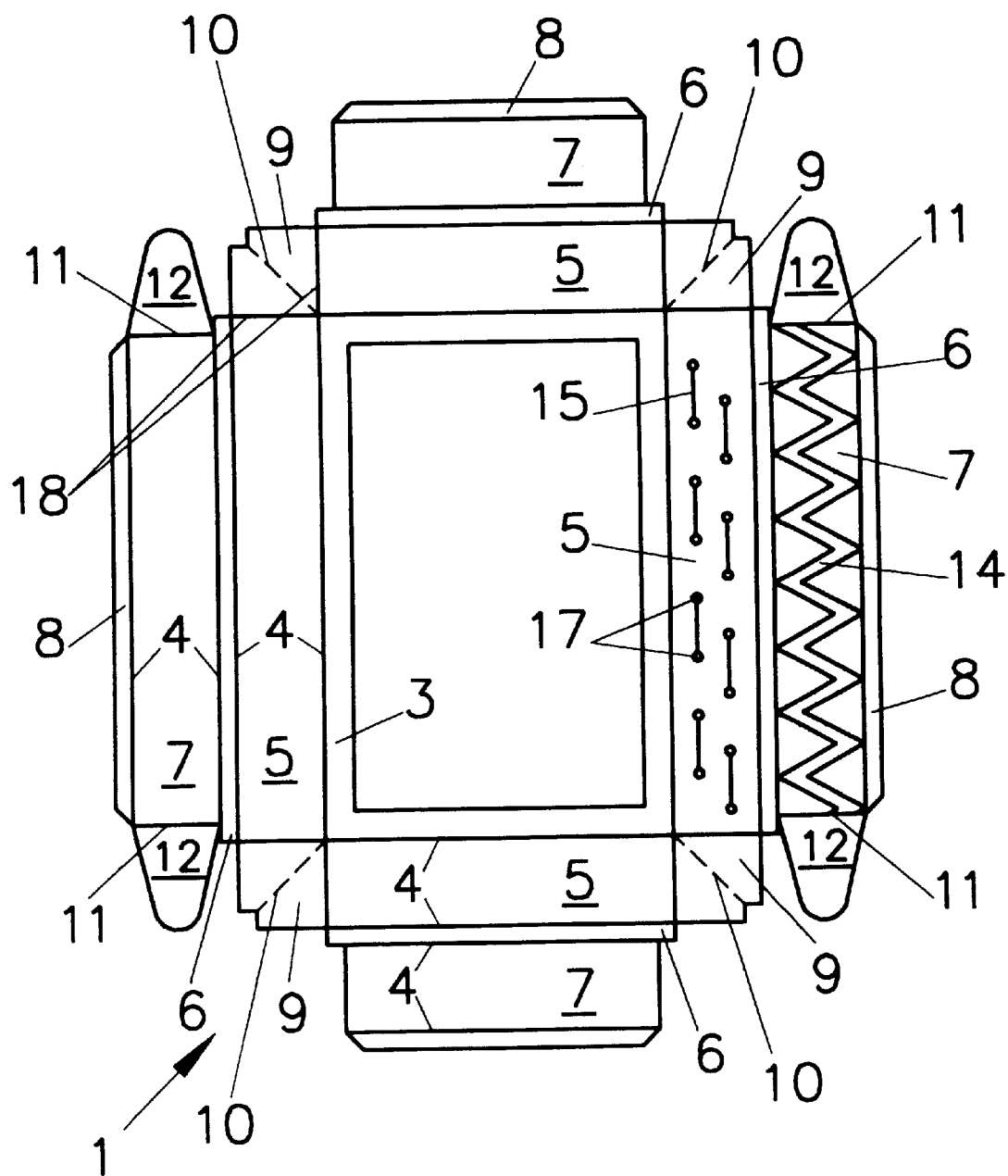
FIG. 2 shows a blank for producing a box profile in accordance with the principles of the present invention.

FIG. 2 shows the blank 1 in unfolded form, i.e., in a single plane. The workpiece from which this blank 1 may be produced is composed of a flat length of nonwoven fabric. Blank 1 is cut from this length and provided with the applicable folding edges 4. Viewed from the center outward, blank 1 is composed of a flat, for example rectangular, base frame 3. This base frame 3 is adjoined as initial sections by parts that will later constitute outer walls 5. These are followed by face walls 6, which in the folded state come to lie parallel to base frame 3. Face walls 6 are adjoined by parts which later, in the folded state, will produce inner walls 7. Outer walls 5 and inner walls 7 come to lie parallel to one another. Base tongues 8 of outer walls 7 are joined to base frame 3. This may be accomplished by heat-sealing or gluing. First folding edges 4 predefine the intended manner of folding of inner walls 7 and outer walls 5, respectively, and of face walls 6 and base tongues 8.

The two inner walls 7 that lie lengthwise with respect to filter cartridge 21 have tongues 12, which are joined via second folding edges 11 to inner walls 7. In the folded state, tongues 12 are applied against the inner walls 7 that lie crosswise with respect to filter cartridge 21. Tongues 12 are joined to the crosswise inner walls 7 using an adhesive.

Corner sections 9 are present on mutually adjoining outer walls 5. Between end sections 9 and outer walls 5 are folding edges 18. Furthermore, end sections 9 have additional folding edges 10, running diagonally across end sections 9. These folding edges 10 are perforated. During the folding process to form box profile 2, folding edges 10 are pulled inward into the box profile 2. Here it is advantageous if the tongues produced from end sections 9 fit against and are fixed to the lengthwise outer wall 5.

Base tongues 8 are folded outward, applied against base frame 3 and joined thereto. The entire folding process yields a frame 20 in the shape of a double-walled box profile 2, into which a correspondingly configured filter element 13 may be inserted. The outer walls 5 and inner walls 7 of the box profile 2 may be continuous, as shown at the left side of FIG. 2. But it is also possible, as shown at the right side of FIG. 2, to provide recesses 14 or slots 15 in inner walls 7 and outer walls 5 for retaining the filter element 13 or a sealing material 16 surrounding frame 20.

A zigzag-shaped recess 14 is cut into opposing inner walls 7 of the box profile 2. The outer ends of filter element 13 are inserted into this recess. Thus, not only is filter element 13 retained in box profile 2, but its folding may be predefined and fixed.

For fastening a sealing material, particularly a nonwoven sealing material 16, the entire outer wall 5 is provided with slots 15 into which a part of sealing material 16 is pushed. Holes 17 at the ends of the slots 15 permit the lips of slots 15 to be configured in a defined manner such that the sealing material 16 is retained well there.

Figure 3:
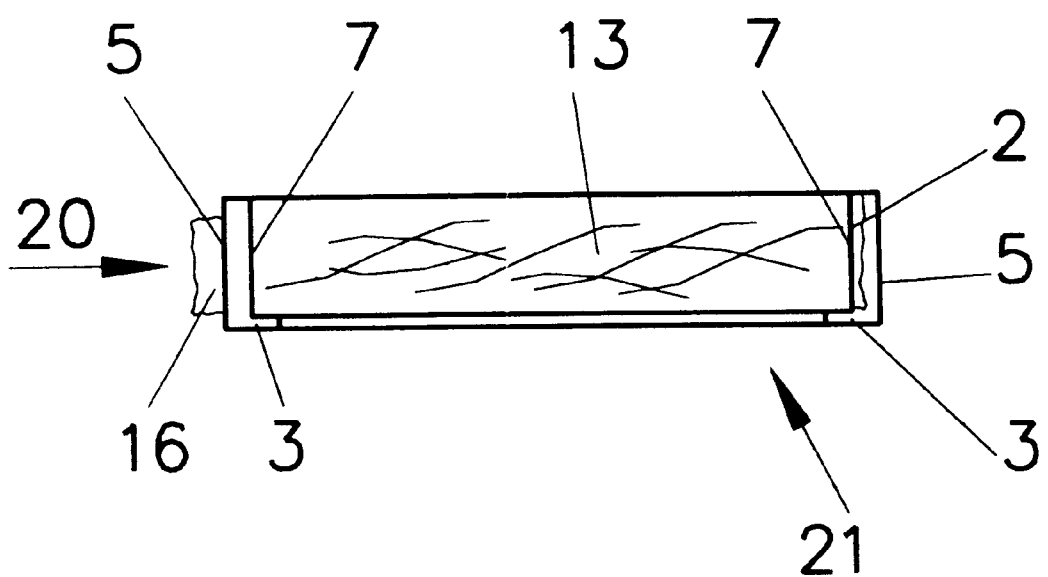
FIG. 3 shows a cross-sectional view of the filter cartridge constructed according to the principles of the present invention.

FIG. 3 shows a cross section through filter cartridge 21. Frame 20 is formed by box profile 2 having inner walls 7 and outer walls 5. Base frame 3 protrudes beyond inner walls 7 into the interior of box profile 2. Filter element 13 is inserted in frame 20. Its outer ends may, as indicated at the right side of the FIG. 3, protrude into the space between inner walls 7 and outer walls 5, by being pushed through recesses 14.

At the left side of the FIG. 3, sealing material 16 is also shown, parts of which are passed through slots 15 and likewise protrude into the interior between outer walls 5 and inner walls 7.

What is claimed is:

1. A filter cartridge, comprising:

a flexurally rigid frame; and a filter element inserted in the flexurally rigid frame, wherein:

the flexurally rigid frame is formed from a single-piece blank that is folded inward to form a double-walled box profile, and the single-piece blank is joined to the filter element.

2. The filter cartridge as recited in claim 1, wherein the single-piece blank includes:

a flat, rectangular base frame, outer walls, face walls, inner walls, base tongues, and initial folding edges, and
wherein the outer walls, the face walls, the inner walls, and the base tongues are separated from each other by the initial folding edges and are adjoined to the base frame in sequence from a center of the base frame along an outward direction.

3. The filter cartridge according to claim 2, wherein each outer wall includes at least two rows of slots.

4. The filter cartridge as recited in claim 2, wherein the outer walls are arranged into pairs of mutually adjacent outer walls, and wherein the box profile includes:

square corner sections, additional folding edges, and the pairs of mutually adjacent outer walls being joined together by the square corner sections, the square corner sections being perforated by the additional folding edges, and the additional folding edges passing diagonally through the square corner sections and ending at the base frame.

5. The filter cartridge as recited in claim 2, wherein the base tongues are applied flush against a surface of the base frame and are nonremovably joined to the base frame.

6. The filter cartridge as recited in claim 2, wherein:

the filter element includes fold ends, the inner walls extend perpendicularly with respect to the fold ends of the filter element and include recesses, and each fold end of the filter element is inserted into an associated one of the recesses.

7. The filter cartridge as recited in claim 2, wherein the outer walls include a plurality of slots for fastening a sealing material that edges the base frame.

8. The filter cartridge as recited in claim 7, wherein each one of the plurality of slots includes an end at which is disposed an associated round hole.

9. The filter cartridge as recited in claim 1, wherein the box profile includes:

a plurality of inner walls including at least two mutually opposite inner walls, second folding edges, and tongues joined to the at least two mutually opposite inner walls via the second folding edges, wherein the tongues are capable of being engaged with a remaining number of the plurality of inner walls.

10. The filter cartridge as recited in claim 1, wherein the flexurally rigid frame and the filter element are formed from the same material.

11. The filter cartridge as recited in claim 1, wherein the filter element and the box profile are fitted together.

12. The filter cartridge as recited in claim 11, wherein the filter element and the box profile are glued together.

13. A method for producing a frame for a filter cartridge, comprising the steps of:

forming a single-piece blank from a flat workpiece using an industrial plotter; and folding the single-piece blank inward to form a double-walled box profile.

* * * * *